United States Patent
Wolf et al.

(10) Patent No.: US 8,727,412 B2
(45) Date of Patent: May 20, 2014

(54) EXTERIOR REAR VIEW MIRROR FOR A MOTOR VEHICLE

(75) Inventors: Thomas Wolf, Riedstadt (DE); Gabi Koerner, Wiernsheim (DE); Marcus Mueller, Pforzheim (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 98 days.

(21) Appl. No.: 13/367,618

(22) Filed: Feb. 7, 2012

(65) Prior Publication Data

US 2012/0206827 A1      Aug. 16, 2012

(30) Foreign Application Priority Data

Feb. 15, 2011  (DE) .......................... 10 2011 000 740

(51) Int. Cl.
*B60R 1/06*       (2006.01)
(52) U.S. Cl.
CPC ................ *B60R 1/06* (2013.01); *B60R 1/0602* (2013.01)
USPC ......................................... 296/1.11; 359/507
(58) Field of Classification Search
USPC .............. 296/1.11, 146.1, 152, 154; 359/507, 359/509, 841, 871–877; 248/475.1
See application file for complete search history.

(56) References Cited

U.S. PATENT DOCUMENTS

| 5,621,570 A | 4/1997 | Hack et al. |
| 6,595,576 B2 * | 7/2003 | Mizutani et al. ............. 296/152 |
| 2008/0291560 A1 * | 11/2008 | Mueller ....................... 359/872 |
| 2010/0264633 A1 * | 10/2010 | Schmierer ................. 280/743.1 |

FOREIGN PATENT DOCUMENTS

| DE | 3429493 C | * 12/1985 |
| DE | 44 44 126 | 6/1996 |
| DE | 197 43 107 | 4/1999 |
| DE | 102004037066 B3 * | 2/2006 |
| DE | 10 2008 013 605 | 9/2009 |

OTHER PUBLICATIONS

Translation of DE 10 2004 037 066 B3, retreived from the EPO website via Patent Translate on Aug. 7, 2013.*

* cited by examiner

*Primary Examiner* — Glenn Dayoan
*Assistant Examiner* — Jason S Daniels
(74) *Attorney, Agent, or Firm* — Gerald E. Hespos; Michael J. Porco; Matthew T. Hespos

(57) ABSTRACT

To avoid wind noises and to reduce soiling of mirror glass during travel in the rain, the exterior rear view mirror for a motor vehicle has a droplet channel in a first circumferential region of the mirror housing that includes the housing top and a separation edge in a second circumferential region on the housing bottom. The droplet channel and the separation edge overlap in a lateral region. Rain droplets that strike the mirror housing during travel flow both on the bottom housing side and on the top housing side toward the rear edge of the housing. Water droplets flowing on the bottom are collected by the separation edge and are blown away by the air flow which is directed down at the separation edge. On the housing top side, the droplets are collected by the droplet channel and conducted away laterally toward the housing bottom.

9 Claims, 2 Drawing Sheets

EXTERIOR REAR VIEW MIRROR FOR A MOTOR VEHICLE

CROSS REFERENCE TO RELATED APPLICATION

This application claims priority under 35 USC 119 to German Patent Application No 10 2011 000 740.7 filed on Feb. 15, 2011, the entire disclosure of which is incorporated herein by reference.

BACKGROUND OF THE INVENTION

1. Field of the Invention

The invention relates to an exterior rear view mirror for a motor vehicle.

2. Description of the Related Art

DE 197 43 107 C2 discloses an exterior rear view mirror for a vehicle. The mirror has a separation edge on the bottom side of a mirror housing. The separation edge is formed by a curvature in front of a boundary wall of the housing, and a longitudinal trough is formed between the separation edge and the boundary wall. An encircling groove adjoins the longitudinal trough at a distance from the front edge of the mirror housing. The encircling groove and the separation edge with the longitudinal trough are intended to prevent rainwater from passing onto the reflector surface of the mirror.

It is the object of the invention to provide an exterior rear view mirror for a motor vehicle that reduces a soiling tendency of the mirror glass during travel in the rain and that avoids wind noises.

SUMMARY OF THE INVENTION

The invention relates to an exterior rear view mirror with a droplet channel on a housing top side and a separation edge on a housing bottom side to reduce soiling of the mirror glass and wind noises. The droplet channel is arranged in a first circumferential region of the exterior rear view mirror on a housing top side and a separation edge is arranged in a second, adjoining circumferential region on a housing bottom side. The droplet channel and the separation edge each run at a distance from a housing end edge and, in the transition from the housing top side to the housing bottom side, the droplet channel and the separation edge overlap at a side outer surface of the mirror housing.

The droplet channel extends circumferentially from an outermost upper point on the housing top side of the mirror housing as far as a laterally outermost point on the side outer surface of the mirror housing. The separation edge extends from an outermost lower point on the housing bottom side of the mirror housing beyond the laterally outermost point of the droplet channel on the side outer surface of the mirror housing as far as a point above the outermost point on the side outer surface of the mirror housing.

The profile of the droplet channel and the separation edge with the overlap on the mirror housing minimizes aero-acoustic disadvantages, such as wind noises and, during travel in the rain, the rain droplets striking against the mirror housing flow both onto the bottom and onto the top housing surface in the direction of the housing rear edge. The water droplets flowing onto the bottom side are collected by the separation edge and are blown away by the air flow, which is directed downward at the separation edge. On the housing top side, the rain droplets are collected by the droplet channel and conducted laterally away in the direction of the housing outer side. The droplet channel and the separation edge overlap in the region of the laterally outermost point of the mirror housing. Water flowing out of the droplet channel is transferred onto the separation edge and conducted to the housing bottom side at this location, thus preventing the mirror glass from being contaminated by water droplets during travel in the rain.

The droplet channel preferably is a groove with a U-shaped cross section that is molded into the mirror housing at a low level and has a rear edge located lower than the front edge with respect to the direction of travel. The rear edge of the droplet channel is arranged lower than the front edge of the droplet channel by at least 1 mm.

A tangent placed onto the curved housing top side in the longitudinal direction of the mirror housing has an angle with a horizontal plane of >0°, preferably at least 1° to 3°, in the outlet to the front edge of the droplet channel. This design and arrangement of the droplet channel in the mirror housing very substantially avoids wind noise caused by air in the region of the front edge of the droplet channel being able to flow off obliquely up and in no way striking against the rear edge of the droplet channel.

The separation edge comprises a rib which protrudes radially from the mirror housing and, beginning at half the housing height, at the lateral point of the side wall of the mirror housing forms together with the droplet channel the overlap on both sides of the plane x-x, in which the protruding rib of the separation edge is arranged behind the droplet channel—as seen with respect to the direction of travel of the vehicle.

The overlap of the droplet channel and the separation edge is at least twice to three times the width of the droplet channel. This overlap on the outer housing side of the exterior rear view mirror over a certain region of extent ensures that rainwater flowing down in the region of the outlet of the droplet channel is picked up by the separation edge and conducted away in the direction of the housing bottom side.

The droplet channel runs exclusively only in a first circumferential region on the housing top side and not encircling the entire mirror housing, as in DE 197 43 1007 C2. Thus, a cost-effective production of the mirror housing is possible in a manufacturing process using just one tool slide instead of a plurality of tool slides. The design of the droplet channel the invention has a rear edge lower than the front edge. Thus, the air flows beyond the droplet channel obliquely up and away and not onto the rear edge of the droplet channel, as in the known embodiment.

An exemplary embodiment of the invention is illustrated in the drawings and is described in more detail below.

DETAILED DESCRIPTION OF THE PREFERRED EMBODIMENTS

Figure 1:
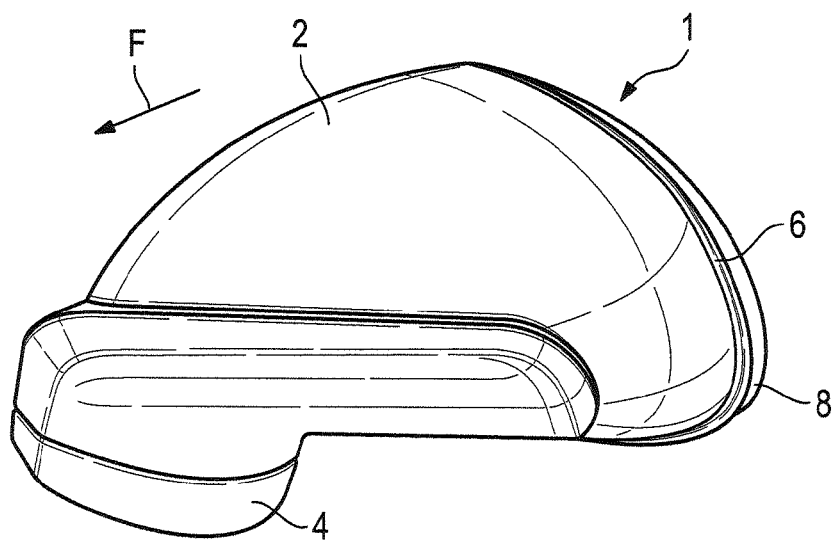
FIG. 1 is a diagrammatic illustration of a mirror housing for an exterior rear view mirror, as seen obliquely from the rear, with the droplet channel and separation edge.

An exterior rear view mirror 1 for a motor vehicle essentially comprises a curved mirror housing 2 in which a mirror glass 3 is arranged. The mirror housing 2 is connected to the vehicle via a foot 4. In the mirror housing 2, a droplet channel 6 is arranged in a first circumferential region A from a top side 5 of the mirror housing 2 and a separation edge 8 is arranged in a second circumferential region B that adjoins the first circumferential region A but extends from a bottom side 7 of the mirror housing 2.

Figure 2:
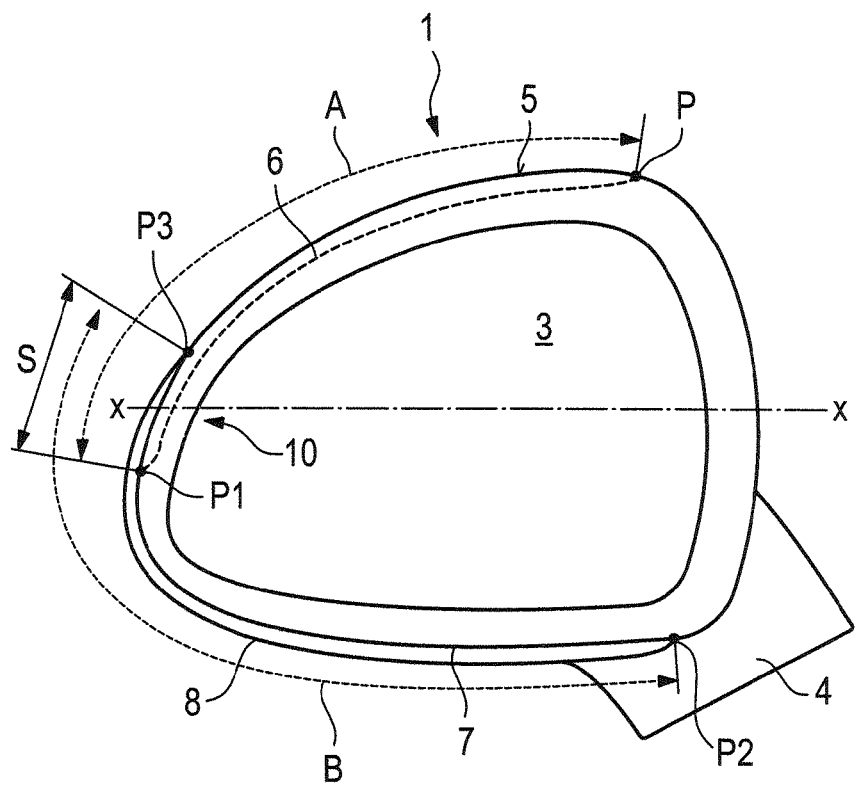
FIG. 2 is a front view of the mirror housing with the droplet channel on the housing top side, the separation edge on the housing bottom side and an overlap.
Figure 3:
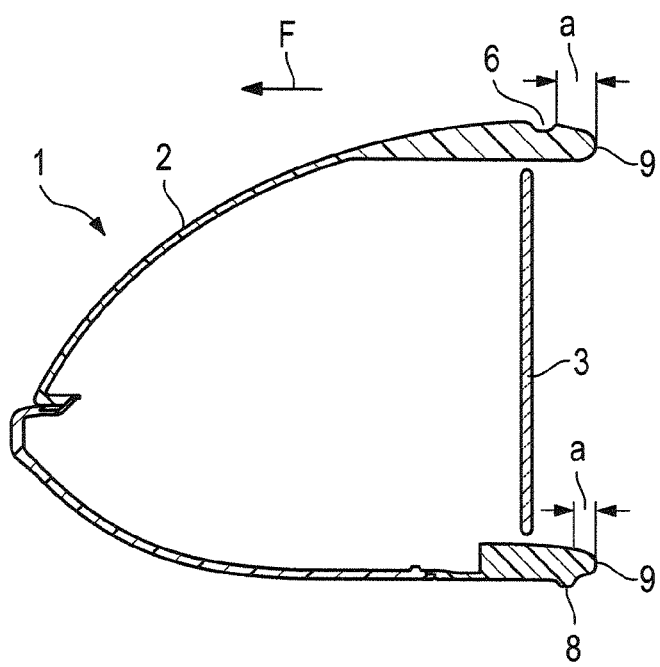
FIG. 3 is a section through the mirror housing with the droplet channel and separation edge and with the mirror glass inserted.
Figure 4:
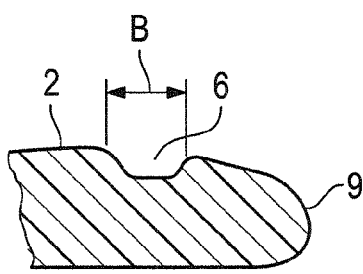
FIG. 4 is an enlarged detailed illustration of the droplet channel in the mirror housing.

The separation edge 8 and the droplet channel 6 are arranged at a distance from the housing end edge 9 and form an overlap S on a side outer surface 10 of the mirror housing 2. The droplet channel 6 extends circumferentially in the mirror housing 2 from an outermost upper point P of the mirror housing 2 as far as a laterally outermost point P1 on the side outer surface 10 of the mirror housing 2, as illustrated in FIG. 2.

The separation edge 8 extends on the circumference of the mirror housing 2 from an outermost lower point P2 of the mirror housing 2 beyond the lateral outermost point P1 of the droplet channel 6 on the side outer surface 10 of the mirror housing 2 and to a point P3, which is arranged above said outermost point on the side outer surface 10 of the mirror housing 2. The overlap S between the droplet channel 6 and the separation edge 8 extends between the points P1 and P3.

Figure 6:
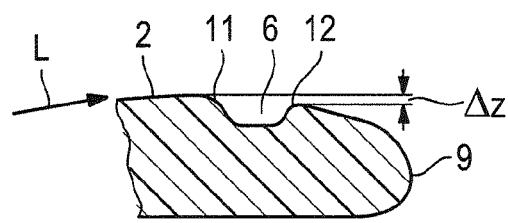
FIG. 6 is an illustration of the droplet channel with a vertical offset from the front edge to the rear edge of the droplet channel.

The droplet channel 6 is a groove with a U-shaped cross section and is molded into the mirror housing 2 so that a rear edge 12 is located lower than the front edge 11 by a vertical offset z, as illustrated in more detail in FIG. 6.

The offset z between the front and rear edges 11, 12 of the droplet channel 6 is preferably ≥1 mm. The vertical offset z of the front edge 11 with respect to the rear edge 12 is essential. Additionally, all of the exterior rear view mirror 1 rearward of the droplet channel 6 are lower than the front edge 11, as shown in FIG. 6.

Figure 5:
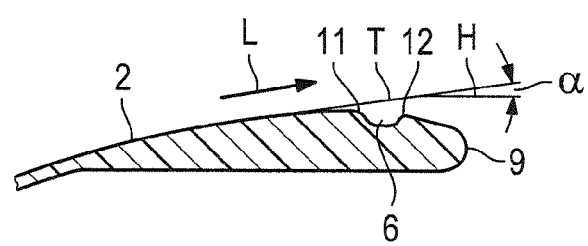
FIG. 5 is a detailed illustration of the droplet channel with the flow profile.

As illustrated in FIG. 5, the mirror housing 2 is configured to guide airflow L away from and beyond the droplet channel 6 to avoid wind noise. More particularly, the curvature of the mirror housing 2 is shaped convexly in the region of the droplet channel 6 so that a tangent line T that is tangent to the curved housing top side 5 and that extends in the longitudinal direction of the mirror housing 2 forms an angle α with a horizontal H of >0°, preferably 1 to 3°, in the outlet to the front edge 11 of the droplet channel 6.

The separation edge 8 preferably comprises a rib that protrudes radially out from the mirror housing 2 and extends from the point P3 on the side outer surface 10 of the mirror housing 2, which is above a plane x-x that is at half the height of the mirror housing 2. The separation edge 8 has an overlap S with the droplet channel 6 that extends on both sides of the plane x-x. In the overlap S, the protruding rib of the separation edge 8 is behind the droplet channel 6—as seen with regard to the direction of travel F. The overlap S of the droplet channel 6 and separation edge 8 is at least twice to three times the width B of the droplet channel 6.

What is claimed is:

1. An exterior rear view mirror for a motor vehicle, the exterior rear view mirror comprising: a foot for connection to the motor vehicle, a curved mirror housing connected to the foot, the mirror housing having a top part, a bottom part opposite the top part, an inner side surface extending between the top and bottom parts on a side of the mirror housing toward the foot and an outer side surface opposite the inner side surface, a mirror glass forward of a rear edge of the mirror housing, a droplet channel arranged in a first circumferential region of the mirror housing, the droplet channel having a first end at an area on top part of the mirror housing in proximity to the inner side surface and a second end on the outer side surface of the mirror housing, and a separation edge arranged in a second circumferential region of the mirror housing, the separation edge having a first end at an area on the bottom part of the mirror housing in proximity to the inner side surface and a second end on the outer side surface of the mirror housing, the first and second circumferential regions adjoining one another, the droplet channel and the separation edge each being forward a distance from the rear edge of the housing, the second end of the droplet channel extending lower than the second end of the separation edge to define an overlap at a transition from the top part to the bottom part at the outer side surface of the mirror housing.

2. The exterior rear view mirror of claim 1, wherein the second end of the droplet channel is at a laterally outermost point on the outer side surface of the mirror housing.

3. The exterior rear view mirror of claim 2, wherein the second end of the separation edge extends beyond the laterally outermost point of the droplet channel on the outer side surface of the mirror housing and is arranged above the outermost point on the outer side surface of the mirror housing.

4. The exterior rear view mirror of claim 3, wherein the droplet channel is a groove of substantially U-shaped cross section molded into the mirror housing and having a rear edge lower than a front edge.

5. The exterior rear view mirror of claim 4, wherein the rear edge of the droplet channel is lower than the front edge of the droplet channel by an amount of at least 1 mm.

6. The exterior rear view mirror of claim 4, wherein a tangent placed on a curved top of the mirror housing and running in a longitudinal direction of the mirror housing has an angle α with a horizontal plane of >0°, at an outlet from the front edge of the droplet channel.

7. The exterior rear view mirror of claim 6, wherein the tangent placed on the curved top of the mirror housing and running in the longitudinal direction of the mirror housing has an angle α with the horizontal plane of at least 1° to 3°.

8. The exterior rear view mirror of claim 1, wherein the separation edge comprises a rib that protrudes radially on the mirror housing, the second end of the separation edge being at a point on the outer side surface of the mirror housing that is above a plane that is at half a height of the mirror housing, the second end of the droplet channel being below the plane so that the overlap of the separation edge with the droplet channel is on both sides of the plane, and the protruding rib of the separation edge being between the droplet channel and the rear edge of the mirror housing.

9. The exterior rear view mirror of claim 1, wherein a length of the overlap is at least twice a width of the droplet channel.

* * * * *